Figure 1:
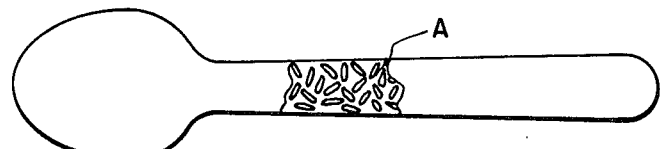

United States Patent [19]

Frank

[11] 4,065,244

[45] Dec. 27, 1977

[54] APPARATUS FOR MOLDING POLYMERIC MATERIALS

[75] Inventor: Alan I W Frank, Pittsburgh, Pa.

[73] Assignee: The Alan I W Frank Corporation, Exton, Pa.

[21] Appl. No.: 694,596

[22] Filed: June 10, 1976

Related U.S. Application Data

[62] Division of Ser. No. 539,483, Jan. 8, 1975, abandoned.

[51] Int. Cl.$^2$ .............................................. B29C 3/00
[52] U.S. Cl. ................................... 425/412; 425/447; 425/451.2; 264/294
[58] Field of Search .............. 264/328, 327, 325, 322, 264/323, 294; 425/352, 443, 447, 451.2

[56] References Cited

U.S. PATENT DOCUMENTS

| | | | |
|---|---|---|---|
| 3,166,617 | 1/1965 | Munk | 425/352 X |
| 3,430,797 | 3/1969 | Goins | 264/325 X |
| 3,483,288 | 12/1969 | Paulson | 264/328 |
| 3,492,387 | 1/1970 | Larson | 264/323 X |
| 3,739,052 | 6/1973 | Ayres et al. | 264/327 X |
| 3,750,450 | 8/1973 | Sharp et al. | 264/294 X |

Primary Examiner—Robert L. Spicer, Jr.
Attorney, Agent, or Firm—Reed, Smith, Shaw & McClay

[57] ABSTRACT

A process of molding polymeric material comprising causing heated polymeric material to flow in a predetermined direction in a mold and cooling the polymeric material forming a product exhibiting anisotropic properties including greater stiffness in the direction of flow than in any other direction. Also molding apparatus comprising two mold parts each having a mold cavity, the molding apparatus being so constructed and arranged that communication between the two mold cavities may be established and disestablished at will, means for admitting material to be molded into one of the mold cavities and by pressure differential causing flow of some of the material from said mold cavity into the other mold cavity when communication between the mold cavities is established, and means for cooling the flowing material whereby a product exhibiting anisotropic properties including greater stiffness in the direction of flow than in any other direction may be formed.

4 Claims, 4 Drawing Figures

U.S. Patent   Dec. 27, 1977   Sheet 1 of 2   4,065,244

APPARATUS FOR MOLDING POLYMERIC MATERIALS

RELATED U.S. APPLICATION

This application is a division of U.S. application Ser. No. 539,483 filed Jan. 8, 1975, now abandoned.

This invention relates to molding polymeric material and particularly to a process of molding polymeric material whereby the weight of a product made of foam plastic or other polymeric material may be reduced. Such a product may be, for example, an article of tableware such as a spoon or fork. My process achieves controlled structuring of the polymeric material by causing flow of heated polymeric material in a predetermined direction in a mold and cooling the polymeric material resulting in formation of a product having a structure biased in the direction of flow of the polymeric material whereby the product exhibits anisotropic properties including greater stiffness of the product in said direction than in any other direction. Thus a product is produced having increased strength in said direction for the quantity of polymeric material used. The structure of the cells and/or the molecular orientation of the product are thus controlled. The term "structure" as used herein means cells, molecules, molecular domains, beads, particles or inert or plastic fillers, depending on the particular polymeric material used. The term "molecular domains" as used herein means regions of highly ordered molecules also known as crystallites or micelles.

Polymeric materials which can and do exhibit anistrophic characteristics are known in the art and as stated U.S. Pat. No. 3,430,797 such materials may comprise polyvinylidene chloride, nylon, polyethylene glycol terephthalate. In general, the preferred polymers are the highly crystalline polymers, such as polyethylene, polypropylene, poly-1-butene, poly-4-methylpentene-1,1-olefins having up to 8 carbon atoms per molecule, all as stated in said patent.

I provide a process of molding polymeric material comprising causing heated polymeric material to flow in a predetermined direction in a mold and cooling the polymeric material forming a product exhibiting anisotropic properties including greater stiffness in the direction of flow than in any other direction. I preferably introduce polymeric material into a first mold part, which polymeric material is heated at least as early as when it is in the first mold part, and subject the polymeric material to pressure in the first mold part and release the polymeric material so that some of it flows from the first mold part into a second mold part while cooling the polymeric material, forming a product exhibiting anisotropic properties as above mentioned.

I further provide molding apparatus comprising two mold parts each having a mold cavity, the molding apparatus being so constructed and arranged that communication between the two mold cavities may be established and disestablished at will, together with means for admitting material to be molded into one of the mold cavities and by pressure differential causing flow of some of the material from said mold cavity into the other mold cavity when communication between the mold cavities is established, and means for cooling the flowing material whereby a product exhibiting anisotropic properties including greater stiffness in the direction of flow than in any other direction may be formed.

In a preferred process of practicing the invention I form an article of tableware out of polymeric material by introducing polymeric material into a first mold part in which the body of the article (for example, the bowl of a spoon) is to be formed, which polymeric material is heated at least as early as when it is in the first mold part, whereafter I pressurize the polymeric material in the first mold part into the form of the body and part of the handle of the article and relatively move the first mold part and a second mold part in which the remainder of the handle of the article is to be formed into communicating relationship so that part of the polymeric material flows by pressure differential from the first mold part into the second mold part in a direction longitudinally of the handle to form the entire handle of the article, and I cool the polymeric material as it flows from the first mold part into the second mold part whereby to form an article of tableware having structure biased longitudinally of the handle resulting in increased stiffness of the handle and consequent increased strength of the article for the quantity of polymeric material used.

Other details, objects and advantages of the invention will become apparent as the following description of a present preferred method of practicing the same and a present preferred form of apparatus suitable for practice of the invention proceeds.

Figure 2:
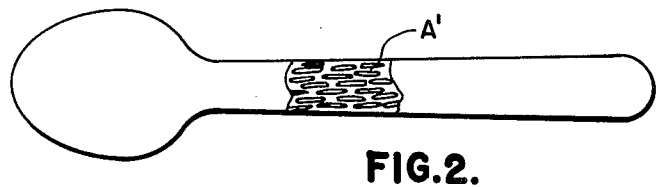

In the accompanying drawings I have illustrated a present preferred method of practicing the invention and have shown a present preferred form of apparatus which may be employed for practice of the invention in which FIG. 1 is a diagram with a portion simulating a sectional photomicrograph of a plastic spoon having a normal non-biased structure;

FIG. 2 is a view similar to FIG. 1 showing the biased structure of the material in the spoon achieved by my invention. The particles shown may represent foam cells, molecular domains, plastic fillers or inert fillers; and FIGS. 3 and 4 are cross-sectional diagrammatic views illustrating a present preferred manner of practicing the invention and showing a present preferred form of apparatus suitable for practice of the invention, FIG. 3 showing the mold parts in an initial position in performance of the process and FIG. 4 showing the mold parts in the final position.

Referring now more particularly to the drawings, FIG. 2 shows in relation to FIG. 1 how the structure (illustrated as cells A in FIG. 1 and A' in FIG. 2) of polymeric material may be biased by my invention. Such structures A' of the polymeric material are shown in FIG. 2 as being biased in the horizontal direction, resulting in increase of the stiffness of the product in that direction resulting in a product exhibiting anisotropic properties as above referred to.

Figure 3:
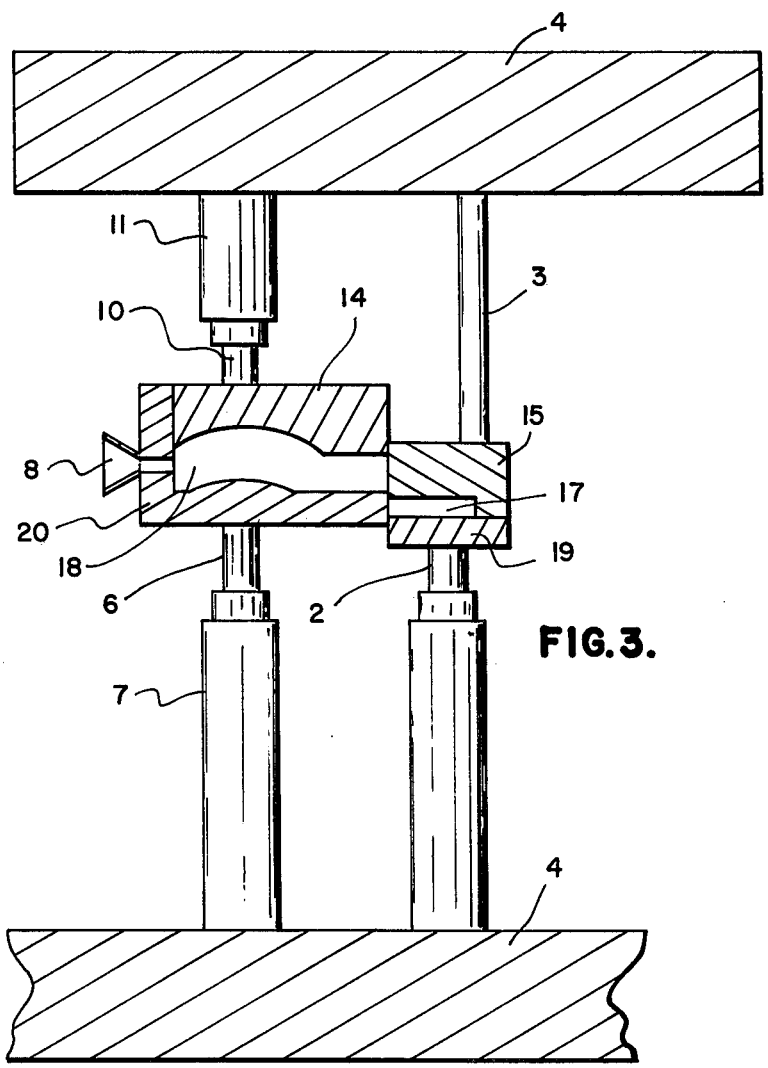
Figure 4:
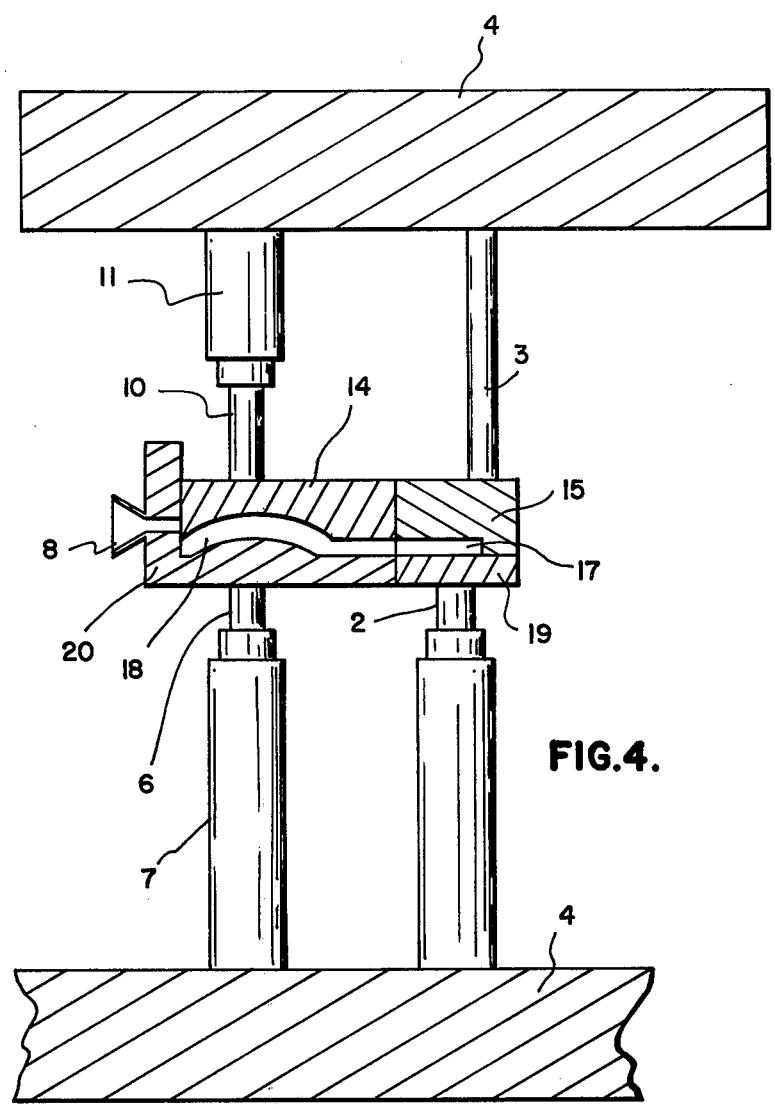

Referring now to FIGS. 3 and 4, those figures show a method and apparatus in which polymeric material is transferred through fill nozzle 8 into mold cavity 18 which in the form shown is a mold cavity for forming the bowl and at least a portion of the handle of a spoon. The mold cavity 18 is formed by an upper mold section 14 and a lower mold section 20 which at the beginning of the process are in the position shown in FIG. 3.

After the mold cavity 18 is filled with polymeric material the upper section 14 and the lower section 20 are moved from the position of FIG. 3 to the position of FIG. 4 by means of pistons in cylinders 11 and 7. The quantity of polymeric material filling the mold cavity 18 as shown in FIG. 3 is sufficient to form the entire spoon. When the mold sections 14 and 20 are moved from the position of FIG. 3 to the position of FIG. 4 the mold cavity 18 is moved into alignment or communicating relationship with the mold cavity 17 in a stationarily mounted mold part 15 and the polymeric material in the mold cavity 18 is pressurized so that some of such polymeric material flows from the mold cavity 18 into the mold cavity 17 wherein at least a portion of the handle of the spoon is formed. The polymeric material is cooled as it flows from the mold cavity 18 into the mold cavity 17 by means not shown which may be conventional which results in formation of a spoon having elements biased in the direction of flow of the polymeric material from the mold cavity 18 into the mold cavity 17 or longitudinally of the handle of the spoon being formed whereby the stiffness of the spoon in the longitudinal direction of its handle is increased and a spoon is produced having increased strength in the longitudinal direction of its handle for the quantity of polymeric material used.

As will be apparent from the above description, the mold section 14 is carried by a piston rod 10 connected with a piston in the cylinder 11, which cylinder is mounted on the underside of a stationary upper support member 4 and the mold section 20 is carried by a piston rod 6 connected with a piston in the cylinder 7, which cylinder is mounted on the upper side of another stationary support member 4. The stationary mold part 15 is positioned by supporting members 2 and 3 connected respectively with the upper and lower support members 4.

While I have shown and described a present preferred method of practicing the invention and have illustrated a present preferred form of apparatus suitable for practice of the invention it is to be distinctly understood that the invention is not limited thereto but may be otherwise variously practiced and embodied within the scope of the following claims.

I claim:

1. A molding apparatus comprising first and second mold cavities adapted for communication with each other to define a product to be molded, said first mold cavity formed by a pair of mold sections, at least one of said sections being movable with respect to said other section for increasing or decreasing the volume of said first mold cavity whereby decreasing said volume substantially defines that portion of the product to be molded in said first mold cavity, means for moving at least one of said sections operably connected thereto, and means for admitting material to be molded into said first mold cavity; said second mold cavity of fixed volume defining the remaining portion of the product to be molded and adapted for communication with said first mold cavity; and means for bringing said mold cavities into communication with each other to define the product to be molded.

2. A molding apparatus as set forth in claim 1 wherein said means for bringing said mold cavities into communication with each other comprises means for moving at least one of said mold cavities into communication with the other cavity.

3. A molding apparatus as set forth in claim 2 wherein said means for moving at least one of said sections and said means for moving said mold cavities into communication with each other operate to reduce said first mold cavity volume to define said portion of said product to be molded and align said cavities into communication at substantially the same time.

4. A molding apparatus as set forth in claim 2 wherein said means for moving said sections and moving said cavities into communication comprise first and second pistons, respectively, said first piston being operably connected to one of said sections adapted for movement and said second piston being operably connected to said other section.

* * * * *